(12) United States Patent
Gavin et al.

(10) Patent No.: US 7,428,701 B1
(45) Date of Patent: Sep. 23, 2008

(54) METHOD, SYSTEM AND COMPUTER PROGRAM FOR REDACTION OF MATERIAL FROM DOCUMENTS

(75) Inventors: Mark Gavin, Aldan, PA (US); Roger Dunn, Stratham, NH (US); Virginia M. Gavin, Aldan, PA (US)

(73) Assignee: Appligent Inc., Lansdowne, PA (US)

( * ) Notice: Subject to any disclaimer, the term of this patent is extended or adjusted under 35 U.S.C. 154(b) by 0 days.

(21) Appl. No.: 09/215,804

(22) Filed: Dec. 18, 1998

(51) Int. Cl.
*G06F 15/00* (2006.01)
*G06F 17/00* (2006.01)

(52) U.S. Cl. ................ 715/243; 715/246; 715/247; 715/788

(58) Field of Classification Search ............ 707/512, 707/530, 500; 713/176; 705/51; 715/511–512, 715/500, 530, 243, 246, 247, 788
See application file for complete search history.

(56) References Cited

U.S. PATENT DOCUMENTS

| | | | | |
|---|---|---|---|---|
| 5,581,682 A | * | 12/1996 | Anderson et al. | 707/530 |
| 5,903,646 A | * | 5/1999 | Rackman | 705/51 |
| 6,209,095 B1 | * | 3/2001 | Anderson et al. | 713/176 |
| 6,279,013 B1 | * | 8/2001 | LaMarca et al. | 707/500 |
| 6,457,026 B1 | * | 9/2002 | Graham et al. | 715/512 |

OTHER PUBLICATIONS

Gladney, H.M., Access control for large collections, ACM Transactions on Information Systems (TOIS), vol. 15, Issue 2, Apr. 1997, pp. 154-194.*

Precise/Discovery, Automating the entire litigation document collection process, Website <http://www.precise.ab.ca/products/discovery.html>, Precise Systems Corporation, Jul. 5, 1998 (confirmed via archive.org), downloaded on Dec. 4, 2002, pp. 1-3.*

Redax, Web article by Digital Applications, Inc., downloaded on Mar. 10, 2005, with a last update of Dec. 13, 1997, downloaded from <http://web.archive.org/web/19971221013620/http://digapp.com/>, pp. 1-2.*

Pontin, Jason, TechSmith ships Win95 screen capture utility, InfoWorld Jan. 15, 1996, vol. 18, Issue 3, pp. 1-3 (via ProQuest Direct).*

Microsoft Word 97—bundled with Microsoft Office 97, application screenshots, pp. 1-5, Microsoft Corporation, first released Oct. 1996.*

Microsoft newsgroup thread: Aug. 2001, newsgroup <http://groups.google.com/group/microsoft.public.word.newusers>, pp. 1-4.*

* cited by examiner

*Primary Examiner*—William L Bashore
(74) *Attorney, Agent, or Firm*—Duane Morris LLP

(57) ABSTRACT

A method of redacting content from a document in electronic form includes the steps of selecting a geometric area on the document for redaction, representing the selected geometric area as one or more annotation objects, identifying information in the document representing content and location and nature of content, representing the identified information as one or more content objects, identifying content having the same geometric location as the annotation objects and creating a file with the identified content removed to produce a redacted document.

14 Claims, 5 Drawing Sheets

Fig. 4

Information Systems Security

Information technology costs for the Federal Government exceeded $25 billion in 1995. Within its civilian agencies, the 1(k)(1) ernment employed 120,000 information technology workers, and operated 25,000 medium and large mainframe computers and more than two million individual work stations.¹ The Department of Defense has over two million computers, 10,000 local area networks, and 100 long-distance networks. The civilian sector has a critical responsibility to maintain privacy and services for the public using automated data processing and relying on the National Information Infrastructure. Just as critical to the Department of Defense is its ability to carry out any mission that is dependent on information carried on and supported by the NII. If key responsibilities of both the civilian and military sectors of government are heavily dependent upon an unsecured, potentially unavailable 1f(d)(5), (b)(6), (b)(8), (b)(5) ust address whether this reliance on the NII (and GII) is acceptable and, if so, how to manage the risks involved.

3(b)(5) standing considerable expenditures on information technology, there exists a widening chasm between the security requirements of and the protection provided for unclassified systems government-wide and those applied to the classified

Fig. 5

METHOD, SYSTEM AND COMPUTER PROGRAM FOR REDACTION OF MATERIAL FROM DOCUMENTS

FIELD OF THE INVENTION

This invention relates to computer programs for redaction of material from documents stored as electronic files.

BACKGROUND OF THE INVENTION

For a variety of reasons, documents must be presented in their original format, with certain material, such as text or illustrations, redacted. For example, in response to Freedom of Information Act requests, U.S. Government agencies must release certain documents. Often, these documents contain information which is exempt from disclosure under FOIA. The documents themselves are released in their original format, but the material that is exempt from disclosure must be removed. In other situations, such as in litigation, counsel may wish to provide a document in response to a discovery request, but remove privileged portions of the document.

Traditionally, the primary method of redacting information from documents was to take a physical copy of the document, and cover over the text and images to be redacted. Covering would be done manually with tools such as a black marker, a grease pencil, or strips of opaque tape. This process is slow and labor intensive. Also, on review of the redacted document, if the reviewer determines that information which is required to be disclosed has been redacted, it is difficult to correct such errors. Once the process is completed, the document can be photocopied and a photocopy furnished to the requester. Many U.S. Government agencies have been placing such documents on World Wide Web servers to make the documents available over the Internet. The documents must be scanned before being placed on the Web server.

Methods have been developed to perform redaction of electronic documents. Typically, these methods operate on tag image file format (TIFF) files. Conventionally, these products employ overlays of opaque blocks of color to cover information in the TIFF document.

A variety of disadvantages are associated with TIFF files, particularly when compared with the portable document format (PDF) files in the format developed by Adobe Systems, Inc. For example, in the TIFF format, designers have great flexibility in creating tags, which results in certain applications not being able to read all TIFF files. More recent versions of TIFF are not interchangeable with older versions. Also TIFF files for the same document are much larger than comparable PDF files. The overlays of opaque blocks of color, ordinarily saved separately from the document pages, causes a delay when a document is opened while the overlays are placed by software on the page. Generally, custom programming and system integration is required for the TIFF programs to be operational, because not all applications are compatible with TIFF files. If the overlays of blocks of color are not properly embedded in the document, it is possible for the overlays to be removed. The software packages that are commercially available for redaction of TIFF files are only available for certain operating systems, and do not operate on a variety of platform. For example, such systems are not compatible with both systems that operate on Windows PC's and Macintosh PC's. Finally, if large portions of the text are removed, the opaque blocks of color tend to be very large. This can render printing of the documents to be problematic.

OBJECTS AND ADVANTAGES OF THE INVENTION

It is an object of the invention to provide a method, a system, and a computer program for convenient identification of portions of a document to be redacted, and for rapid redaction of electronic documents.

It is a further object of the invention to provide a method, system, and computer program for redaction of electronic documents that eliminates the risk of unauthorized recovery from the redacted document of the material that was excised.

Among the advantages of the invention are that the foregoing objects are achieved.

Additional objects and advantages of the invention will become evident from the detailed description of a preferred embodiment, which follows.

SUMMARY OF THE INVENTION

A method according to the invention includes the steps of selecting a geometric area on the document for redaction and representing the geometric area as one or more objects. The information in the document representing material to be reviewed, such as text and images, is then represented as a series of geometric locations and codes and stored as one or more objects. The objects representing the geometric area and the objects representing the document information are then compared. An output is created in which the document information is replaced where the geometric location of the geometric areas corresponds to the geometric location of the document information. The resulting output does not contain any of the removed information.

BRIEF DESCRIPTION OF THE FIGURES

FIG. 4 is also a sample screen illustrating a step in a method according to the invention.

FIG. 5 is a sample screen illustrating a document redacted according to the invention.

DETAILED DESCRIPTION OF AN EMBODIMENT OF THE INVENTION

Figure 1:
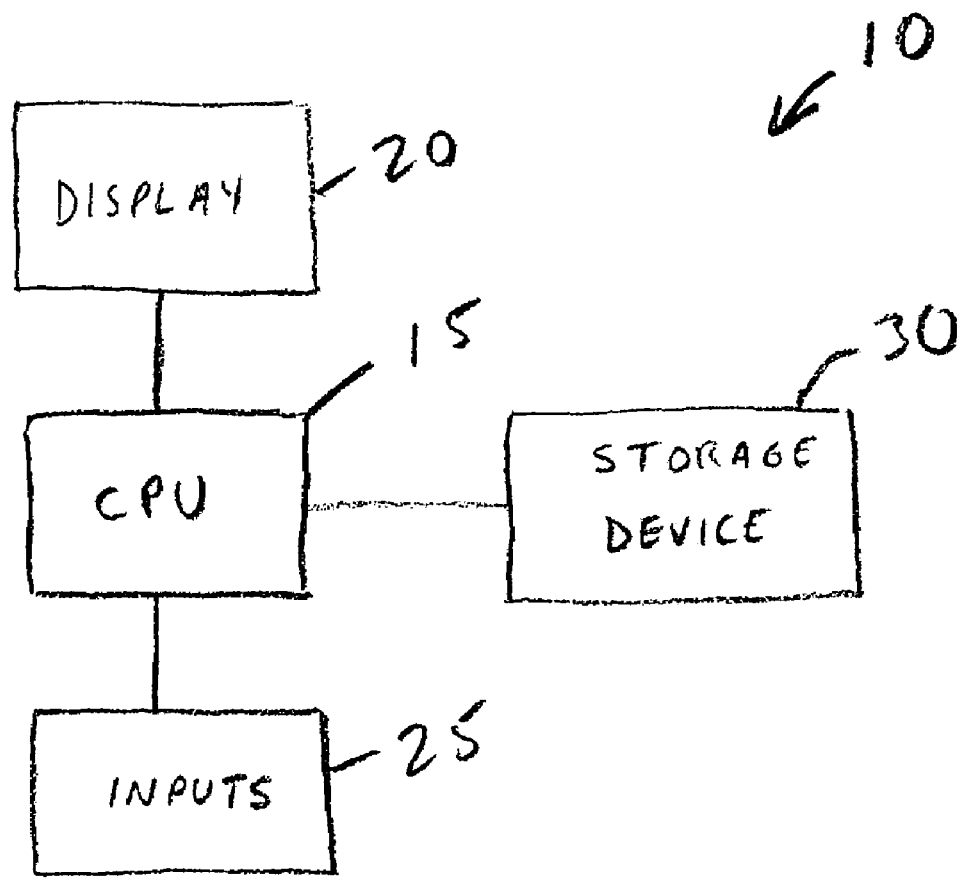
FIG. 1 depicts a computer system according to the invention.

Referring to FIG. 1, there is depicted schematically the principal hardware components of a computer system 10 of a type which may be used in a method and system according to the invention. Computer system 10 has a central processing unit 15, a display 20, inputs 25, and a storage device 30. Central processing unit 15 may be any one of numerous conventional microprocessors, such as the Intel Pentium processor or various Motorola processors employed in Macintosh personal computers. Display 20 may be a CRT, LCD, or other display device. Inputs 25 are conventionally a keyboard and a mouse, although other input devices may be employed. Storage device 30 may include any storage medium on which a computer program may be stored, including without limitation hard drive, floppy drives, tapes, and the like. Of course, storage device 30 may be accessed over a communications link or network.

Figure 2:
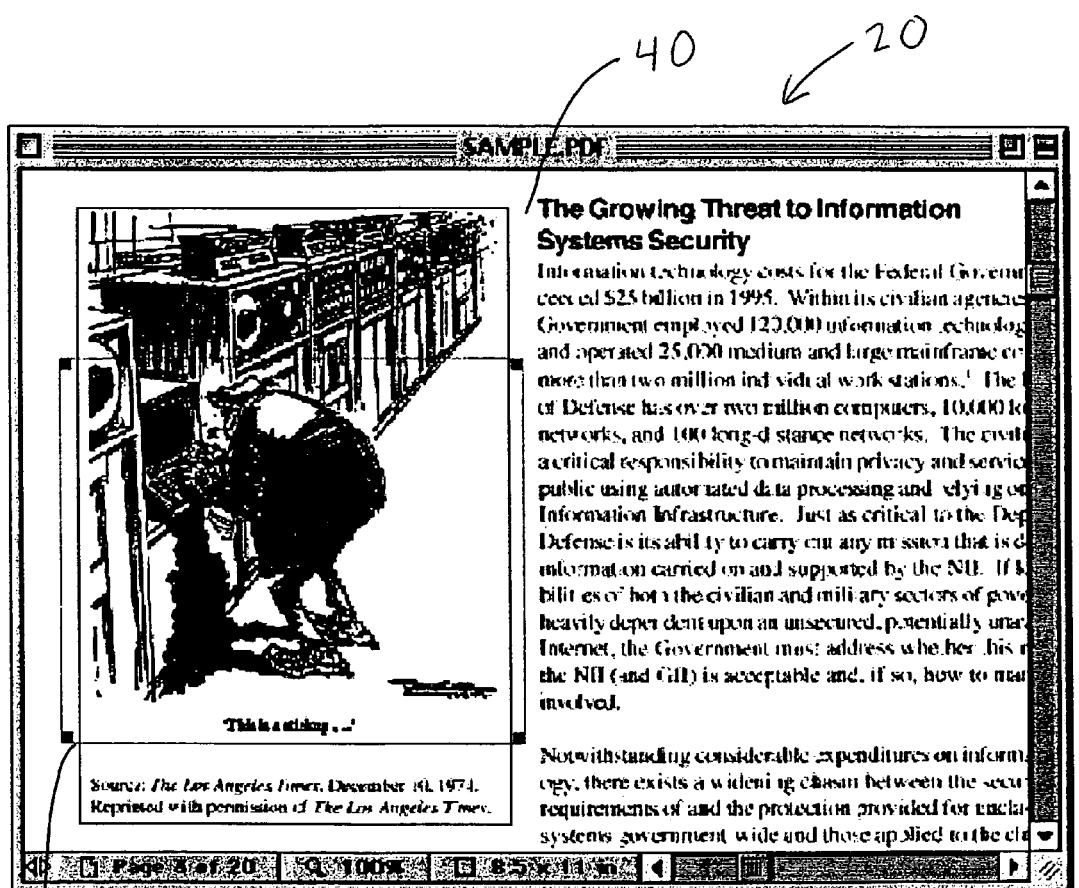
FIG. 2 is a sample screen illustrating a step in a method according to the invention.

Referring to FIG. 2, there is shown a display 20 during a step while a program according to the invention stored on a storage device is running on CPU 15. A program for the display and manipulation of portable document format (PDF) files is loaded from memory and begins running on the CPU. The PDF display program may be Adobe Acrobat, for example. The user opens the PDF file containing the document to be redacted. A redaction program according to the invention is then loaded and begins running. The user has an option of drawing a geometric shape to start the selection process. As may be seen in FIG. 2, document 40 is displayed on display 20. The redaction program displays a rectangle 45 superimposed over a portion of document 40. The user may manipulate the size and location of rectangle 45 by suitable features in the software, such as movement of a cursor 50 using a mouse or other input device. The rectangle may also be referred to as a box or a frame. In principle, other geometric shapes may be employed.

Figure 3:
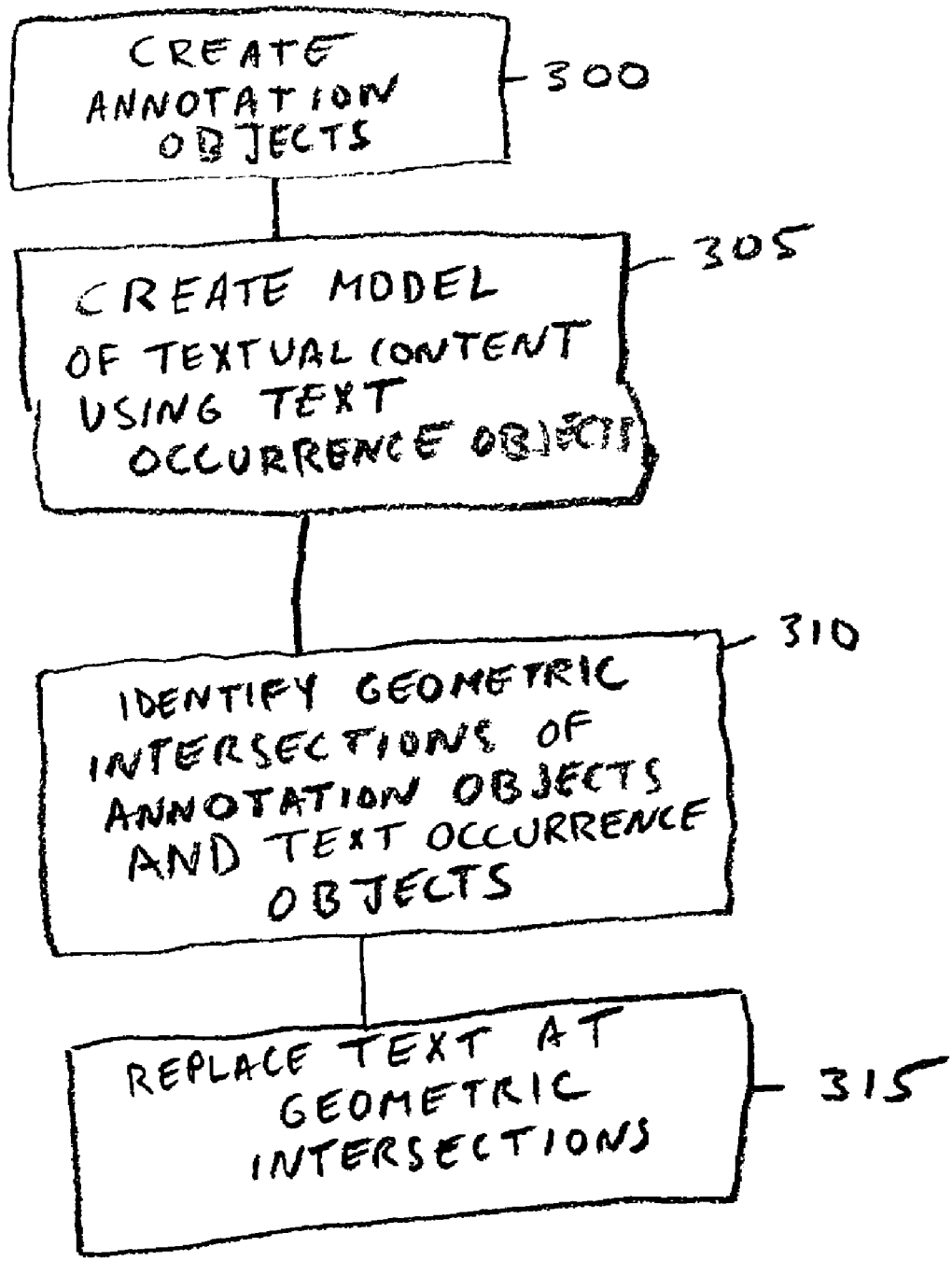
FIG. 3 is a flow chart illustrating steps and a method according to the invention.

The user may select a particular size and location for rectangle 45 at any time. When the user does this, the redaction program stores an object in memory having geographic information representing the location of the borders of rectangle 45 on document 40. Referring to FIG. 3, this step is indicated by block 300. The format of the geographic information is a series of coordinate points relative to the PDF page drawing coordinate system. The objects may also contain information selected by a user employing a menu or other options embodied in the redaction program. Such information may include codes identifying the nature of the redaction, or comments associated with the redaction. An example of the display of such codes is shown in FIG. 4. In FIG. 4, document 40 is shown with several boxes 45 representing geographic areas to be redacted. As can be seen, codes 50, such as (j)(2), (k)(1), and the like, are shown associated with boxes 45. For the convenience of the user, the content, both text and images, within the boxes, is also visible. The objects are stored in association with the document file. When another user next opens the document file, the annotations may be viewed in combination with the file. In this manner, a first line reviewer may create annotations for review and ready change by a manager.

After any further changes have been made, the next step is the performance of the redaction. A preliminary step is the translation from the geometric space occupied by the rectangles, as reflected in the stored annotations, to the layout of the textual content of the PDF format document. The first step in the translation is the creation of a model of the content, as shown by the box labeled 305. The model is created by parsing the PDF stream. In the parsing process, the instructions, or information that relate to the text and images and the geographic location of the text and images are identified and stored. For text, these instructions include those that relate to font selection, font size, the transformation matrix through which individual characters are drawn, character and word spacing, escaped characters, and the tokens that cause text to be emitted. The resulting model represents the text as a list of objects describing each occurrence of text using font characteristics and geometric parameters. The model is stored in a convenient memory location. The objects will be referred to as text occurrence objects. Similarly, image information is modeled as a list of objects describing each image. The objects with image information may be referred to as image occurrence objects. Text occurrence objects and image occurrence objects may also be referred to more generally as content objects. Information regarding text and images in a particular geographic location on the displayed document may be dispersed in a PDF stream. The creation of the model places the information in proximity in a document.

The content objects are then compared to the annotation objects. For text occurrence objects, in the comparison process, geometric intersections identified, as indicated by the box labeled 310. It will be understood that text associated with geometric intersections is to be redacted. The program can create an output file. For text that is not identified as corresponding to an annotation object, the text object is reproduced in the output file. As text to be redacted is identified, the text is replaced in an output file with appropriate material, as indicated by the block labeled 315. The replacing material may be exemption codes, hyphens, or other material selected by the user. The output file is also in the form of objects. The output file comprises a geometric representation as a series of objects of the textual content, with those portions to be redacted removed. The redacted text is never contained in the output file that constitutes the newly-created document.

If an image is to be redacted, the program carries out the redaction on a pixel-by-pixel basis. All pixels that have been identified as to be redacted are replaced. For example, all pixels to be redacted may be changed to solid black. The redacted image information is therefore never contained in the output file where the newly-created document is found.

As an option, the program will insert additional characters in the output file for text to assure that the original width is maintained.

Figure 5:
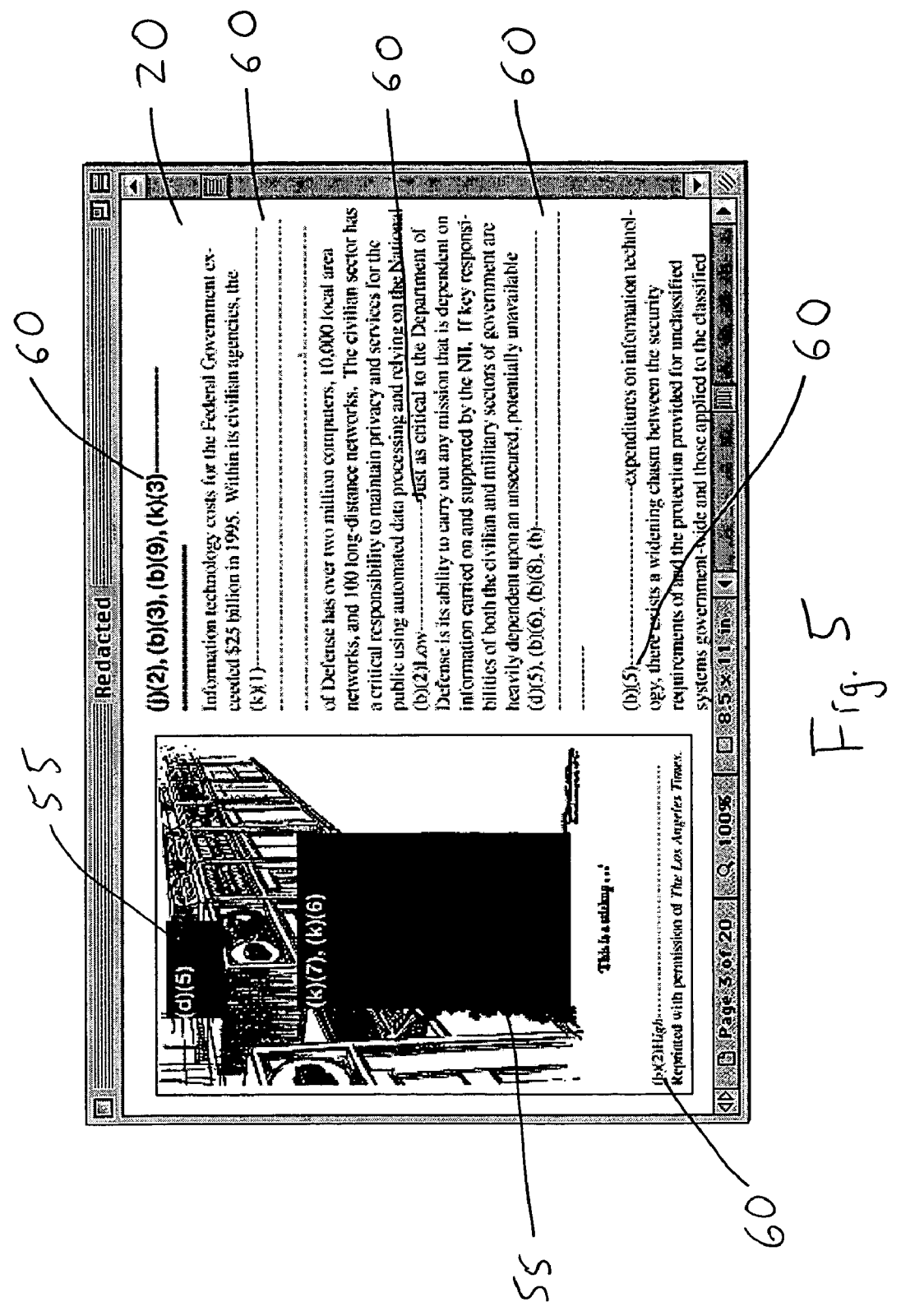

FIG. 5 depicts a displayed redacted document 20. Selected portions of an image have been replaced by all black pixels at 55. Selected portions of the text have been replaced by hyphens, as shown at 60.

The resulting document no longer contains any of the redacted information, as the redacted information was removed in the creation of the document.

Batch annotation and redaction of documents is useful for certain users. For example, Federal government agencies may have lists of keywords that are ordinarily redacted. The method of the invention may include batch annotation and redaction. The user is provided with the option of identifying words that are to be redacted. The method then reviews a selected document in portable document format and creates annotations corresponding to each identified occurrence of the identified word. In a preferred embodiment, the PDF file is parsed and converted into text occurrence objects as described above. The program checks the text occurrence objects against the list of identified words. An annotation object is created coinciding with the geometric position of the word as shown in the text occurrence object. The annotation object can be stored in association with the PDF file. Each occurrence of each of the selected words is thereby designated for redaction. The annotation object can then be considered a candidate annotation for review by a human reviewer.

Through substantially standard techniques, a variety of information can be associated with each annotation. For example, the name of the reviewer, the time and date of creation, codes representing a reason for the exemption, and comments may be included. Displays may include different colors for different reviewers.

The program, method and system of the invention have been described above with respect to the redaction of text from a document. However, the program, method and system may be applied to content of other types, such as image information.

The computer programs in accordance with the invention may be stored and distributed in any suitable storage medium, such as fixed disk, portable diskettes, and CD-ROM or other read-only memories. Also, methods described as being carried out in software running on general-purpose computer hardware may be implemented in hardware.

It will be understood that various changes in the details, materials and arrangements of the programs, methods and systems which have been described and illustrated above in order to explain the nature of this invention may be made by those skilled in the art without departing from the principle and scope of the invention as recited in the following claims.

What is claimed is:

1. A computer implemented method of redacting content from a document in portable document format (PDF) comprising a PDF data stream, comprising the steps of:
    selecting a first geometric area on the document for redaction, said first geometric area having content comprising at least one image;
    selecting a second geometric area on the document for redaction, said second geometric area having content comprising text;
    representing said geometric areas as annotation objects;
    parsing said document into one or more content objects representing content and location and nature of content in said document, said one or more content objects comprising one or more text occurrence objects and one or more image occurrence objects;
    identifying content from said one or more content objects having the same geometric location as said annotation objects; and
    creating an output PDF file comprising said PDF data stream except for portions of said PDF data stream corresponding to said identified content, wherein a redacted document is producible from said output PDF file,
    wherein said selecting step comprises:
    displaying all or a portion of the document; and
    manipulating a movable viewing frame superimposed on the displayed document, content having a geographic location within said frame being visible to the user during said step of manipulation.

2. The method of claim 1, wherein one or more items of information are associated with said annotation object.

3. The method of claim 1, further comprising the step of replacing pixels corresponding to said content comprising at least one image with replacement pixels, said replacement pixels being included in said PDF data stream of said output PDF file.

4. A method of redacting content from a document in portable document format (PDF) comprising a PDF data stream, comprising the steps of:
    selecting at least one geometric area on the document for redaction, said geometric area having content comprising at least one image and text;
    representing said geometric area as one or more annotation objects;
    identifying information in the document representing content and location and nature of content;
    representing said identified information as one or more content objects, said one or more content objects comprising one or more image occurrence objects and one or more text occurrence objects;
    identifying content having the same geometric location as said annotation objects;
    removing said identified content; and
    creating an electronic output PDF file comprising said PDF data stream except for portions of said PDF data stream corresponding to said identified content, a redacted document being producible from said output PDF file for display,
    wherein said information identifying step comprises:
    displaying all or a portion of the document; and
    manipulating a movable viewing frame superimposed on the displayed document, content having a geographic location within said frame being visible to the user during said step of manipulation.

5. The method of claim 4, wherein the redacted text and redacted at least one image are not found in the redacted document.

6. The method of claim 4, wherein said removing step comprises replacing pixels corresponding to said identified content with replacement pixels, said replacement pixels being included in said PDF data stream of said output PDF file.

7. A storage medium having stored therein a plurality of instructions, wherein the plurality of instructions, when executed by a processor, cause the processor to perform the steps of:
    permitting a user to select at least one geometric area on a document for redaction, said geometric area having content comprising at least one image and text, said document being in portable document format (PDF) comprising a PDF data stream;
    representing said geometric area as one or more annotation objects;
    identifying information in the document representing content and location and nature of content, said content comprising at least one image and text;
    representing said identified information as one or more content objects, said one or more content objects comprising one or more image occurrence objects and one or more text occurrence objects;
    identifying content having the same geometric location as said annotation objects;
    removing said identified content; and
    creating an electronic output PDF file comprising said PDF data stream except for portions of said PDF data stream corresponding to said identified content, a redacted document being producible from said output PDF file,
    wherein the information identifying step comprises:
    displaying all or a portion of the document; and
    manipulating a movable viewing frame superimposed on the displayed document, content having a geographic location within said frame being visible to the user during said step of manipulation.

8. The storage medium of claim 7, wherein one or more items of information are associated with said annotation object.

9. The storage medium of claim 7, wherein the text and at least one image marked for redaction have been removed in the redacted document.

10. The medium of claim 7, wherein said removing step comprises replacing pixels corresponding to said identified content with replacement pixels, said replacement pixels being included in said PDF data stream of said output PDF file.

11. A system for redacting content from a document in portable document format (PDF) comprising a PDF data stream, comprising:
    means for permitting a user to select at least one geometric area on the document for redaction, said geometric area having content comprising at least one image and text;
    means for representing said geometric area as one or more annotation objects;
    means for identifying information in the document representing content and location and nature of content, said content comprising at least one image and text;

means for representing said identified information as one or more content objects, said one or more content objects comprising one or more image occurrence objects and one or more text occurrence objects; and means for identifying content having the same geometric location as said annotation objects;

means for removing said identified content, and means for creating an electronic output PDF file comprising said PDF data stream except for portions of said PDF data stream corresponding to said identified content, a redacted document being producible from said output file, wherein the information identifying means comprises:
   means for displaying all or a portion of the document; and
   means for manipulating a movable viewing frame superimposed on the displayed document, content having a geographic location within said frame being visible to the user during said step of manipulation.

12. The system of claim 11, wherein one or more items of information are associated with said annotation object.

13. The system of claim 11, wherein the information to be redacted is not found in the redacted document.

14. The system of claim 11, wherein said means for removing said identified content replaces pixels corresponding to said identified content with replacement pixels, said replacement pixels being included in said PDF data stream of said output PDF file.

* * * * *